(12) United States Patent
Bissacco et al.

(10) Patent No.: US 9,183,452 B2
(45) Date of Patent: Nov. 10, 2015

(54) TEXT RECOGNITION FOR TEXTUALLY SPARSE IMAGES

(71) Applicant: Google Inc., Mountain View, CA (US)

(72) Inventors: Alessandro Bissacco, Los Angeles, CA (US); Hartmut Neven, Malibu, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/269,777

(22) Filed: May 5, 2014

(65) Prior Publication Data
US 2015/0161465 A1 Jun. 11, 2015

Related U.S. Application Data

(63) Continuation of application No. 12/608,877, filed on Oct. 29, 2009, now Pat. No. 8,718,365.

(51) Int. Cl.
| | |
|---|---|
| *G06K 9/00* | (2006.01) |
| *G06K 9/34* | (2006.01) |
| *G06K 9/32* | (2006.01) |
| *G06K 9/68* | (2006.01) |

(52) U.S. Cl.
CPC .. *G06K 9/34* (2013.01); *G06K 9/32* (2013.01); *G06K 9/3208* (2013.01); *G06K 9/3233* (2013.01); *G06K 9/342* (2013.01); *G06K 9/6857* (2013.01); *G06K 2209/01* (2013.01)

(58) Field of Classification Search
CPC . G06K 9/00442; G06K 2209/01; G06K 9/72; G06K 9/00456; G06K 9/344; G06K 9/46; G06K 9/00449; G06K 9/342; G06K 9/6885; G06K 9/00; G06K 9/00483; G06K 9/036; G06K 9/34; G06K 9/00463; G06K 9/4604; G06K 9/50; G06K 9/00409; G06K 9/00469; G06K 9/4638; G06K 17/30253; G06K 17/30047
USPC .......................................... 382/181–231, 284
See application file for complete search history.

(56) References Cited

U.S. PATENT DOCUMENTS

| | | | |
|---|---|---|---|
| 5,187,753 A | | 2/1993 | Bloomberg et al. |
| 5,335,290 A | * | 8/1994 | Cullen et al. .................. 382/176 |

(Continued)

OTHER PUBLICATIONS

Bloomberg, D. et al., "Measuring document image skew and orientation," IS&T/SPIE EI'95, Conference 2422: Document Recognition II, pp. 302-316, Feb. 6-7, 1995, San Jose, CA.

(Continued)

*Primary Examiner* — Alex Liew
(74) *Attorney, Agent, or Firm* — Remarck Law Group PLC

(57) ABSTRACT

A text recognition server is configured to recognize text in a sparse text image. Specifically, given an image, the server specifies a plurality of "patches" (blocks of pixels within the image). The system applies a text detection algorithm to the patches to determine a number of the patches that contain text. This application of the text detection algorithm is used both to estimate the orientation of the image and to determine whether the image is textually sparse or textually dense. If the image is determined to be textually sparse, textual patches are identified and grouped into text regions, each of which is then separately processed by an OCR algorithm, and the recognized text for each region is combined into a result for the image as a whole.

20 Claims, 7 Drawing Sheets

(56) References Cited

U.S. PATENT DOCUMENTS

| | | | |
|---|---|---|---|
| 5,729,637 A * | 3/1998 | Nicholson et al. | 382/282 |
| 5,809,167 A | 9/1998 | Al-Hussein | |
| 6,549,683 B1 | 4/2003 | Bergeron et al. | |
| 8,718,365 B1 * | 5/2014 | Bissacco et al. | 382/175 |

OTHER PUBLICATIONS

Proceedings of the Third International Workshop on Camera-Based Document Analysis and Recognition (CBDAR), Jul. 25, 2009, Barcelona, Spring, 140 pages.

* cited by examiner

Mortgage problems? Call
1-800-555-8322

*Ye Olde
Coffee Shop*

FIG. 5A

Mortgage problems? Call 1-800-555-8322

*Ye Olde
Coffee Shop*

FIG. 5B

TEXT RECOGNITION FOR TEXTUALLY SPARSE IMAGES

CROSS-REFERENCE TO RELATED APPLICATIONS

This application is a continuation of U.S. patent application Ser. No. 12/608,877 filed Oct. 29, 2009. The entire disclosure of the above application is incorporated herein by reference.

BACKGROUND

1. Field of Art

The present invention generally relates to the field of digital imaging, and more specifically, to methods of text recognition for use with images having comparatively little text.

2. Background of the Invention

Recognizing text within a digital image is a useful capability made possible by modern computer systems. Conventional optical character recognition (OCR) algorithms are designed for tasks such as recognizing text within an image—hereinafter referred to as a textually "dense" image—that includes large blocks of regularly-spaced text. For example, textually dense images include digital scans or photographs of pages of a book or magazine, where the text is arranged into columns, paragraphs, lines, and other regular and predictable units of text and occupies the majority, or at least a very sizeable portion, of the image.

However, there are a number of situations in which an image has little text compared to the overall size of the image—i.e., the image is textually "sparse"—and the text is not arranged in predictable units, yet recognition of the small amount of text is still beneficial. For example, a person taking a digital photo of a restaurant on her mobile phone might wish to look up information about the restaurant using the name painted on the restaurant building. As another example, a person taking a digital photo of a street scene using his mobile phone might wish to be presented with the option of dialing a phone number appearing in a billboard within the photo.

Conventional OCR algorithms, which are designed for recognition of text in textually dense images, have several shortcomings when applied to textually sparse images. First, conventional OCR algorithms have relatively poor performance when analyzing textually sparse images, since they perform the same text analysis across the entire image, even though only a small portion of it contains text. Second, conventional OCR algorithms have less than desirable accuracy for textually sparse images. For example, textures or other graphical patterns adjacent to a portion of text may cause the conventional OCR algorithm to fail to recognize that portion as text, instead incorrectly interpreting it to be part of the texture. Conversely, an OCR algorithm will also sometimes incorrectly interpret a non-textual graphical pattern to constitute a small portion of text, e.g. one or two characters. Thus, conventional OCR algorithms tend both to fail to recognize genuine text, and to incorrectly "recognize" small amounts of spurious text.

SUMMARY

A text recognition server is configured to recognize text in a sparse text image, i.e., an image having a relatively small amount of text. Specifically, given an image, the server specifies a plurality of "patches" (blocks of pixels within the image). In one embodiment, the patches include sets of patches of various sizes and overlap with each other. The system applies a text detection algorithm, such as a classifier trained on images previously identified as containing text, to the patches to determine a number of the patches that contain text. This application of the text detection algorithm is used both to estimate the orientation of the image (i.e., whether the image is oriented "vertically," as expected by an OCR algorithm, or whether it is rotated sideways from vertical position), and to determine whether the image is textually sparse, or textually dense (i.e., not sparse).

If the image is determined to be textually sparse, textual patches are identified and grouped into text regions, each of which is then separately processed by an OCR algorithm, and the recognized text for each region is combined into a result for the image as a whole. The separate analysis of individual patches and text regions permits parallelization, resulting in faster processing times. The recognized text may be provided to a client as-is, or it may be further used as input to other systems to obtain additional results, such as search results for the recognized text provided by a search engine.

In one embodiment, a computer-implemented method of recognizing text in an image specifies a plurality of patches within the image. The method identifies, within the plurality of patches, a set of patches that contain text, and groups, within the set of patches, patches proximate to one another into a text region. The method further recognizes text within the text region, and outputs the recognized text.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIGS. 5A and 5B illustrate images in an expected "vertical" orientation and in a rotated orientation, respectively.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
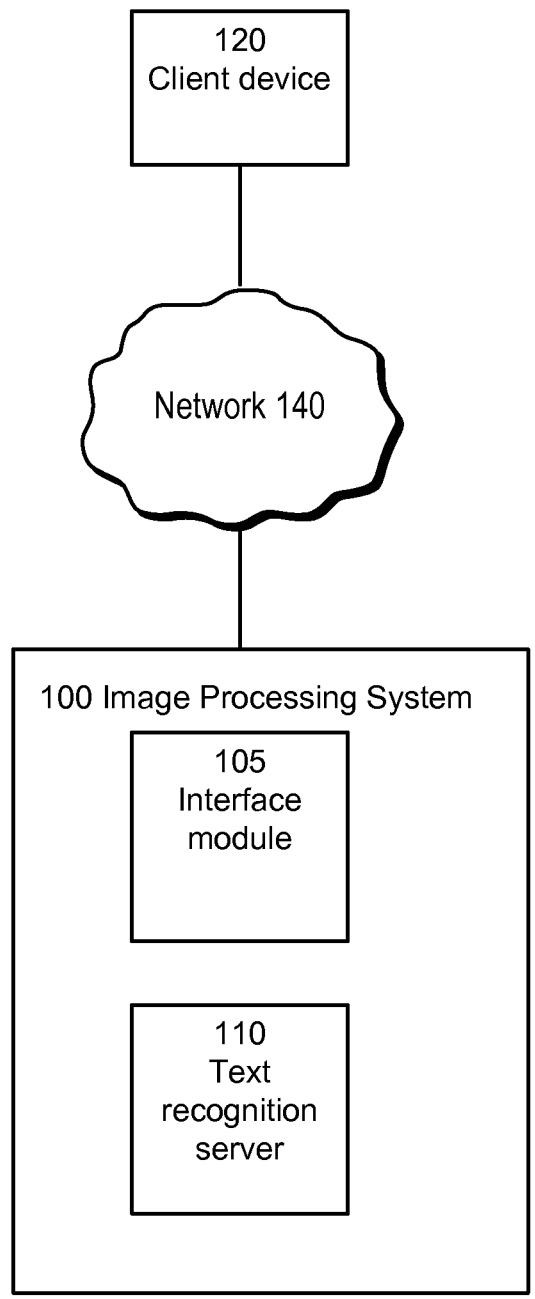
FIG. 1 is a block diagram of an image processing system in accordance with one embodiment of the present invention.

FIG. 1 is a block diagram of an image processing system in accordance with one embodiment of the present invention. An image processing system 100 processes images, such as an image provided by a client device 120 via a network 140. The image processing system 100 can perform a number of different types of analysis on a provided image, such as text recognition, face recognition, general object recognition, and the like. The text recognition features of the system 100 are set forth in detail below. The other possible types of image analysis, such as face recognition, are not the focus of this application and are not discussed further herein.

The client device 120 is a computing device, such as a mobile phone, personal digital assistant, personal computer, laptop computer, or more generally any device connected to the network 140. The client device 120 submits an image to the image processing system 100, e.g., via the network 140.

The image processing system 100 comprises an interface module 105 and a text recognition server 110. The image processing system 100 may additionally comprise any number of other servers for various purposes, such as an face recognition server or a general object recognition server (not depicted).

The interface module 105 receives an image from the client device 120 over the network 140, provides it to the text recognition server 110 (and to any other servers, such as face recognition servers, whose output is desired), receives the recognized text from the text recognition server 110, and provides the text to the client device 120. The interface module 105 can also provide the client device 120 with the results from any other servers that analyzed the provided image.

The text recognition server 110 processes a digital image and outputs text that was recognized within the image. In particular, the text recognition server 110 employs a text recognition algorithm that is optimized for use with textually sparse images. The processed images can be the images received from a client device 120 by the interface module 105, but may equally come from any other source, such as images stored on removable storage media such as a DVD or CD-ROM, images accessible to the image processing system via the network 140, such as images available on public web sites, and the like. The operations of the text recognition server 110 are described below in greater detail with respect to FIG. 3.

The image processing system 100 need not be embodied in a single computer but rather may be partitioned across multiple computers or logical storage units in a number of different manners. For example, in one embodiment, the text recognition server 110 and the interface module 105 constitute, or are located on, distinct physical computer systems. In such an embodiment, although the image processing system 100 is depicted in FIG. 1 as comprising only one text recognition server 110 and one interface module 105, there could be any number of each. For example, there could be multiple separate text recognition servers 110, each being a machine such as that depicted in FIG. 2 (discussed below), thus allowing for text recognition operations to take place in parallel. In another embodiment, the image processing system 100 is a single physical computer system as in FIG. 2, and the interface module 105 and text recognition server 110 are implemented as processes executing thereon. In this embodiment, the text recognition server 110 can perform text recognition operations in parallel if the image processing system comprises sufficient hardware components, such as multiple processors or multi-core processors.

The network 140 represents the communication pathways between the client device 120 and the image processing server 100. In one embodiment, the network 140 uses standard Internet communications technologies and/or protocols. Thus, the network 140 can include links using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Figure 2:
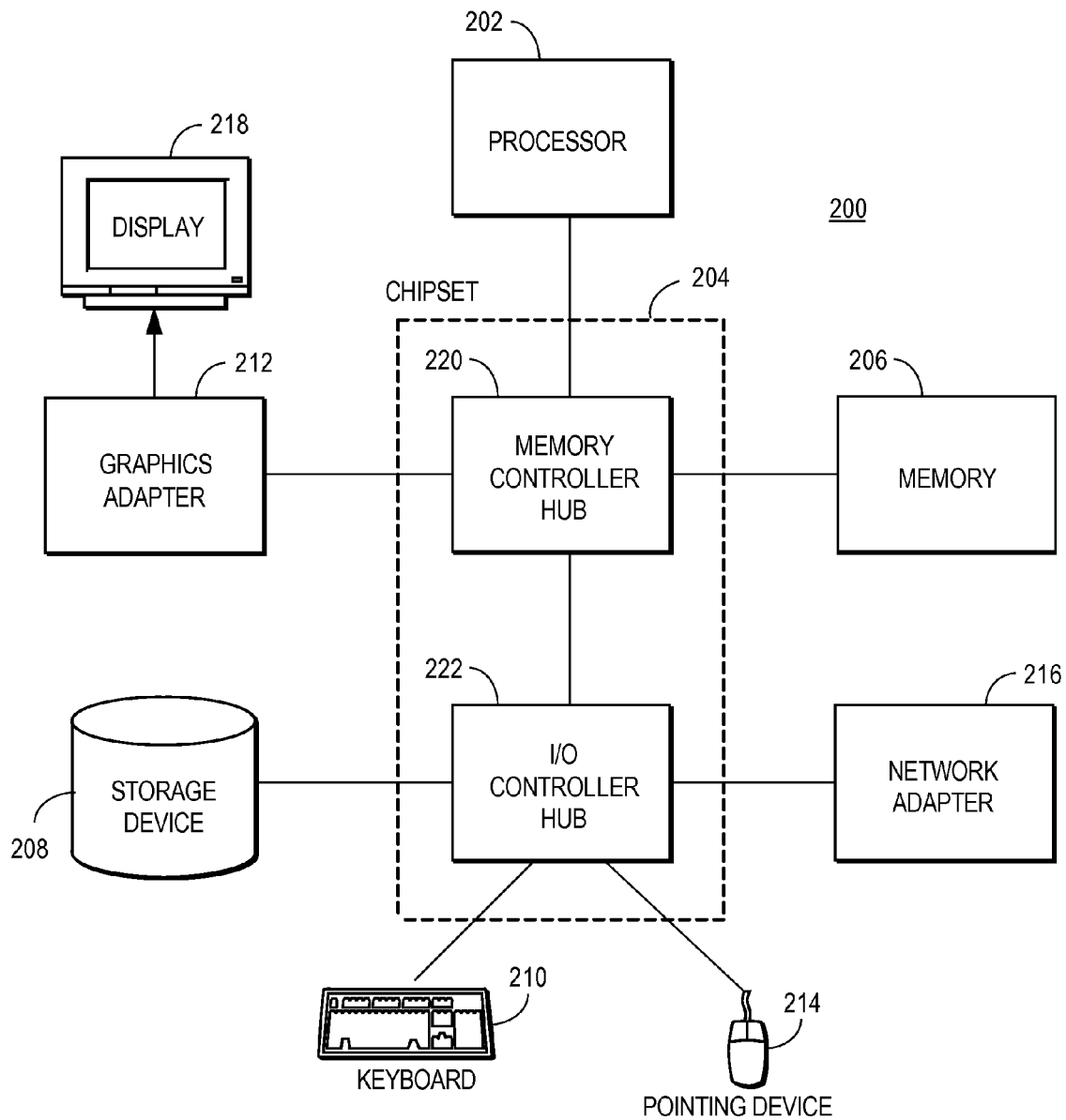
FIG. 2 is a high-level block diagram illustrating physical components of a computer of the image processing system, according to one embodiment

FIG. 2 is a high-level block diagram illustrating physical components of a computer 200 used as part of the image processing system 100 from FIG. 1, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
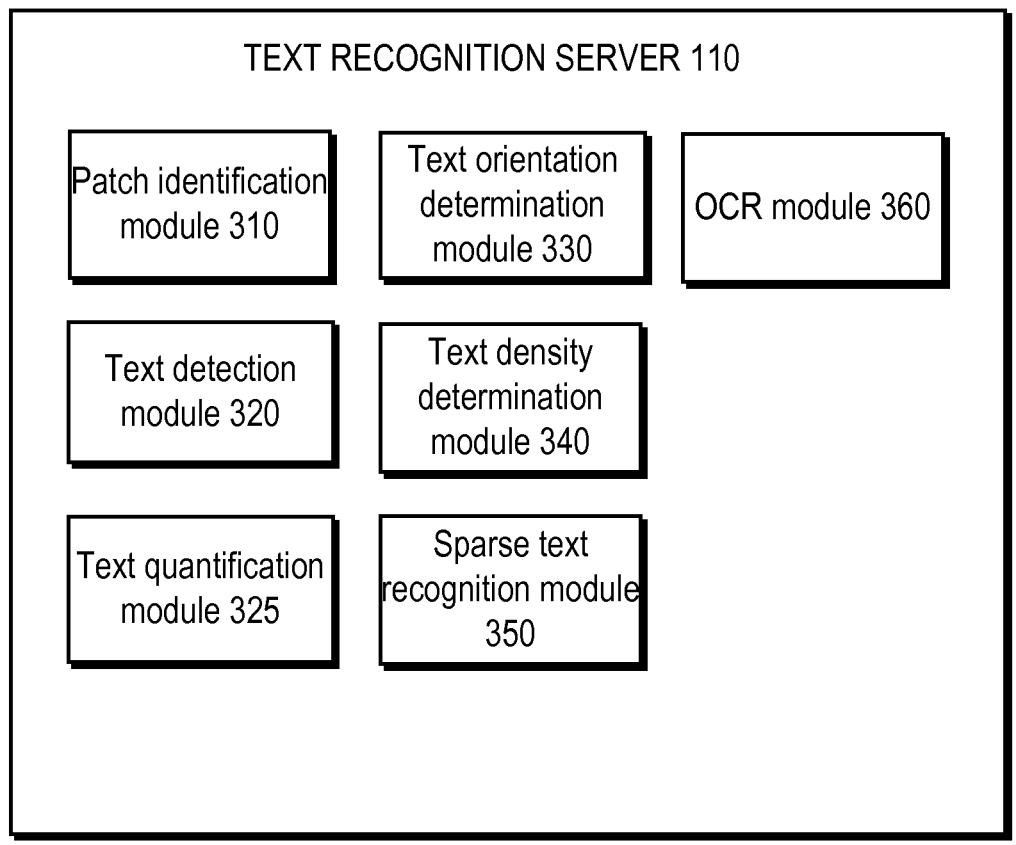
FIG. 3 is a block diagram illustrating a more detailed view of the text recognition server of FIG. 1 according to one embodiment.

FIG. 3 is a block diagram illustrating a more detailed view of the text recognition server 110 of FIG. 1 according to one embodiment. The text recognition server 110 comprises a text orientation determination module 330 for determining whether the text in the image is in the "vertical" orientation expected by an OCR algorithm or (for example) is rotated sideways, a text density determination module 340 for determining whether the image is textually sparse or dense, a sparse text recognition module 350 for recognizing text within a textually sparse image, and several supporting modules 310-325, 360.

Figure 4:
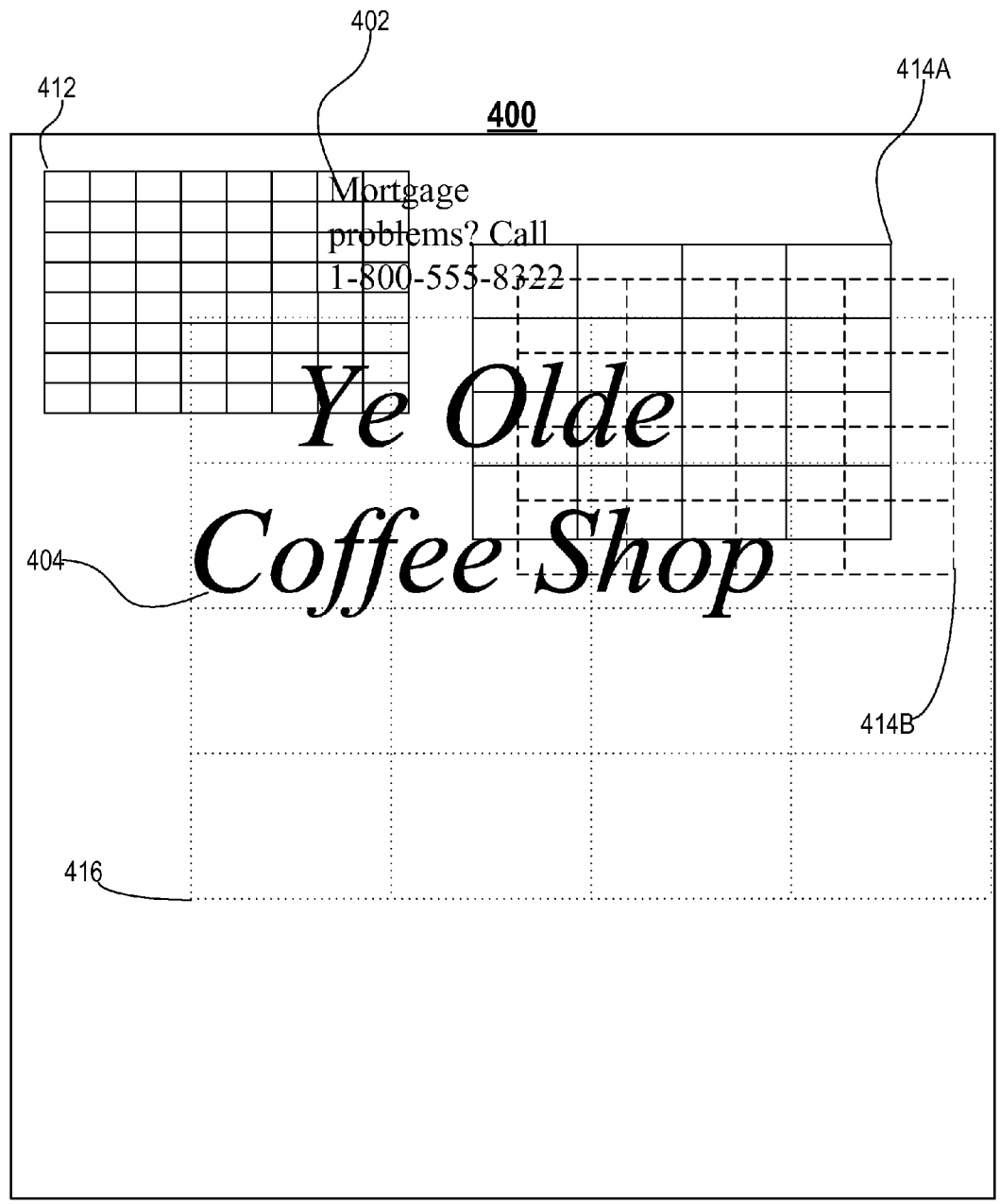
FIG. 4 conceptually depicts various possible patches on an image 400 comprising text items, according to one embodiment.

Generally speaking, the modules 330-350 perform analysis on individual regions of an image, hereinafter referred to as "patches." The boundaries of the various patches to analyze are specified to the modules 330-350 by a patch identification module 310. In one embodiment, the patches are rectangular in shape, although other shapes are also possible. In one embodiment, the patches are drawn from locations that taken together cover the entire image, and have a variety of sizes. FIG. 4 conceptually depicts various possible patches on an image 400 comprising text items 402 and 404, a message to call a particular phone number, and the name of a restaurant, respectively. Although non-textual portions of the image of FIG. 4 are omitted to simplify the discussion, these text items might correspond, for example, to a sign for a coffee shop located in the foreground of the picture, and text on an advertisement located on a billboard in the background. FIG. 4 illustrates the boundaries of a set of patches 412 that comprises patches of comparatively small size. Sets of patches 414A and 414B both contain patches of approximately twice the edge length (and thus four times the area) of those of set 412, and sets of patches 416 are in turn approximately twice the length and four times the area of those of sets 414. (It is appreciated that the depicted patches merely represent the boundaries of pixel regions that are analyzed by the text recognition server 110, and are not part of the image 400 itself).

Note that the individual characters of the comparatively large text item 404 do not fit within the boundaries of the small patches of patch set 412, nor do they fit comfortably within the larger patches of patch sets 414. However, the larger patches of patch set 416 are large enough to contain several characters of text item 404, and are thus better suited for recognition of text by the text detection module 320 than are those of smaller patch sets 412 and 414, although the latter are sized appropriately for recognizing the smaller characters of text item 402. Thus, analyzing patches of various sizes allows for recognition of text that might otherwise have been missed, such as the characters of text item 404, which would likely not have been recognized had only the smaller patches 412, 414 been employed. Similarly, employing overlapping patch sets serves to recognize text that might otherwise have been missed. For example, the text "8322" of the phone number of text item 402 is split vertically between patches of patch set 414B, thus making it unlikely that application of the text detection module 320 to those patches would detect the text. However, the text "8322" falls squarely within the boundary of a patch of overlapping patch set 414A, and thus would be detected as part of analysis of that patch set.

Thus, in one embodiment the patch identification module 310 of FIG. 3 begins with patches of some minimum size, e.g. rectangular regions 32 pixels in width and 16 pixels in height, iteratively moving across the image until the entire image has been covered by some patch. In order to provide overlap in the patches, the next successive patch provided can be located at an offset from the prior patch that is less than the patch dimensions. For example, for a 32×16 pixel patch located at image coordinate (0, 0), the next 32×16 pixel patch could be located at coordinate (16, 0), thus moving over by half the width of the patch, and when that "row" of the image has been completely covered by patches, the next 32×16 patch could be located at coordinate (0, 8), thus moving down by half the height of the patch. Then, when the entire image has been "covered" by patches, the patch identification module 310 chooses a new, larger patch size and repeats the above process using the larger patches. Thus, the patch identification module specifies sets of patches at successively larger patch sizes, thereby allowing recognition of text too large to be identified within smaller patches. In one embodiment, larger sizes are chosen as fractions of powers of 2, e.g. $2^{0.25}$, $2^{0.5}$, $2^{0.75}$, $2^{1}$, $2^{1.25}$, and so forth, thereby producing patches of dimensions 32×16, 38×19, 45×23, 54×27, 64×32, 76×38, and so forth. In one embodiment, larger patches continue to be chosen in this manner until the patch exceeds the size of the image. In another embodiment, larger patches are chosen up to some predetermined maximum size, such as a fixed pixel dimension, or a fixed percentage of the size of the image.

It is appreciated that the sets of patches depicted in FIG. 4 are purely for the purpose of illustration. The patches need not have the exact shapes and sizes depicted, nor need there be only 3 distinct patch sizes. Further, though each patch set 412, 414, 416 is depicted as covering only a portion of the image 400, they should be understood to cover the entire image.

Referring again to FIG. 3, a text detection module 320 operates on patches specified by the patch identification module 310, returning an output indicating whether the patch to which it was applied contains text. In one embodiment, the text detection module 320 is implemented using a classifier algorithm trained to recognize text, such as a cascading classifiers algorithm, in which a number of different visual properties are analyzed to determine whether the image appears to contain text when analyzed according to each property. The classification algorithm is previously trained to recognize text by analyzing a set of images, each marked as containing text or not containing text, in order to learn the visual qualities that indicate the presence of text. In one embodiment, the text detection module 320 ensures that each patch is of a uniform size (e.g. 32×16 pixels), scaling down the contents of a larger patch as necessary, before executing the classifier algorithm.

FIG. 3 further depicts a text quantification module 325, which applies the text detection module 320 to the patches specified by the patch identification module 310 to output a value that quantifies the amount of text that is present within an image. In one embodiment, for example, the text quantification module 325 applies the text detection module 320 to each patch of the set of overlapping patches at each of the various sizes, keeping a count of the number of patches which the text detection module 320 determines to contain text. In other embodiments the quantification output represents values other than number of patches having recognized text, such as an approximation of a total number of characters recognized. The processing of the various patches may be distributed among some plurality of processors, with each of the processors performing analysis (e.g., applying the text detection module 320) on some subset of the patches, thus allowing parallel processing and thereby reducing the overall processing time required.

Both the text orientation determination module 330 and the text density determination module 340 of FIG. 3 use the results from the text quantification module 325 to perform their respective analyses—namely, to determine whether the image is vertical or rotated to some degree, and to determine whether the text is sparse or dense. Initially, it is not known whether the text of the image is in a "vertical" orientation, as OCR algorithms expect, and as depicted in FIG. 5A, or whether (for example) the image was photographed sideways causing the text to be in rotated form, as in FIG. 5B. Thus, the text orientation determination module 330 produces, from the original received image, one or more rotated versions of the image. For the original image and for each rotated version thereof, the text quantification module 325 quantifies the amount of text present in that image, and the text orientation determination module 330 compares the resulting values. In one embodiment, the text orientation determination module 330 selects the image with the greatest resulting value as the version to analyze in the subsequent processing steps. In another embodiment, if none of the images has a result value that is at least some threshold degree greater than that of the others—e.g., 100% greater—then none of the images is definitively determined to be the correctly-oriented image, and each is subsequently further analyzed as described below, rather than only one of them.

As one example, in an embodiment in which the text orientation determination module 330 produces one rotated version rotated 90 degrees clockwise, the text orientation determination module 330 determines the original version of the image to be the version having properly-oriented text if the text quantification module 325 recognized more textual patches within it than within the rotated version, and the rotated version to be the one with properly-oriented text, if not. For example, if the original version of the image were that of FIG. 5B, then the rotated version would be that of FIG. 5A, and the text quantification module 325 would return a greater result value for the rotated version than for the original version, since the text detection module 320 would better recognize text in the properly-oriented image of FIG. 5A.

Referring again to FIG. 3, the text density determination module 340 determines, based on the output value produced by the text quantification module 325 for the image (e.g., the number of patches in which text is detected), whether that image represents dense or sparse text. In one embodiment, the produced value is compared to a threshold, such as 2,000 patches with detected text, to determine whether the image is textually sparse or dense. In one embodiment, the text density determination module 340 only performs this comparison for the version of the image determined by the text orientation determination module 330 to be the version containing correctly-oriented text.

The sparse text recognition module 350 recognizes text within an image, where the text density determination module 340 has deemed the image to be textually sparse. The sparse recognition module 350 employs an OCR module 360 to recognize text within individual identified regions of the image. Thus, the OCR module 360 accepts as input the image and a description (e.g., a bounding rectangle) of a region of the image, and applies the OCR algorithm to that region of the image, producing as output any text found within that region.

Figure 6:
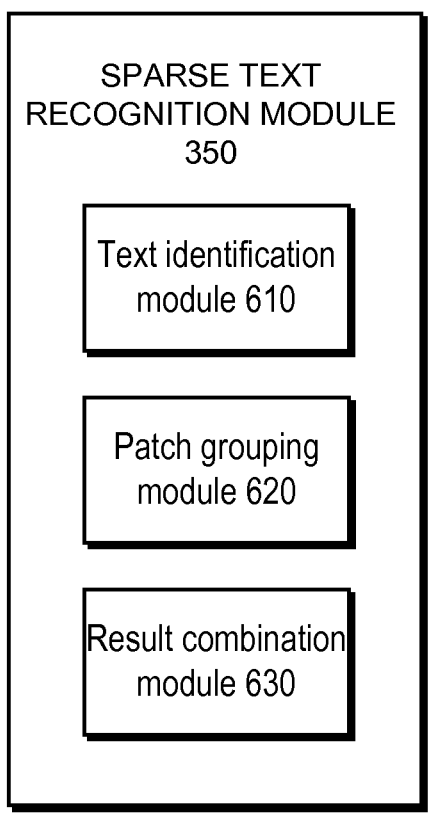
FIG. 6 is a block diagram illustrating a more detailed view of the sparse text recognition module of FIG. 3 according to one embodiment.

FIG. 6 is a block diagram illustrating a more detailed view of the sparse text recognition module 350 of FIG. 3 according to one embodiment. Like the text detection module 320 used by the text quantification module 325, a text identification module 610 first determines whether or not a given patch contains text, but does so using an algorithm optimized for accuracy, rather the algorithm of the text detection module that is optimized for speed. As described above, processing of the patches may be distributed among a plurality of processors and the determinations made in parallel. In one embodiment, the text identification module 610 uses the algorithm of the text detection module 320 to determine whether or not a given patch contains text, but it employs a higher-accuracy setting of that algorithm. For example, where the text detection module 320 uses cascading classifiers, and the text quantification module 325 instructs the text detection module to consider two of the possible classifiers, the text identification module 610 could instruct the text quantification module 325 to consider fourteen factors, resulting in slower but more accurate text recognition. In another embodiment, the text identification module 610 employs a different algorithm different from that of the text detection module 320. In any case, the result of the operation of the text identification module 610 is an identified set of patches found to contain text.

A patch grouping module 620 groups the patches identified as containing text by the text identification module 610 into contiguous regions of text. For example, in one embodiment a patch that has been identified as containing text is grouped with each other adjacent patch (i.e., a patch on the same grid of patches that is above, below, to the left, or to the right, of the patch in question) also identified as containing text, forming one text region. In another embodiment, overlapping patches identified as containing text are grouped into a single text region by forming the union of the overlapping areas using hierarchical agglomerative clustering, in which patches are iteratively grouped into a region as long as there remain ungrouped patches with a sufficiently large overlap with the region.

The sparse text recognition module 350 applies the OCR module 360 of FIG. 3 to each region identified by the patch grouping module 620, producing a set of textual outputs, one for each region. The result combination module 630 then combines the individual textual outputs derived by the OCR module 360 for each of the text patch groupings into an aggregated textual result associated with the entire image. In one embodiment, this is accomplished by concatenating the individual textual results in an order corresponding to a language or text system with which the image is associated. For example, where an image is considered to contain text in the English language (e.g., because the image was submitted to the image processing system 100 via a server located in the United States), the individual textual results are combined in the left-to-right, top-to-bottom order in which English text is conventionally arranged.

Process of Text Recognition

Figure 7:
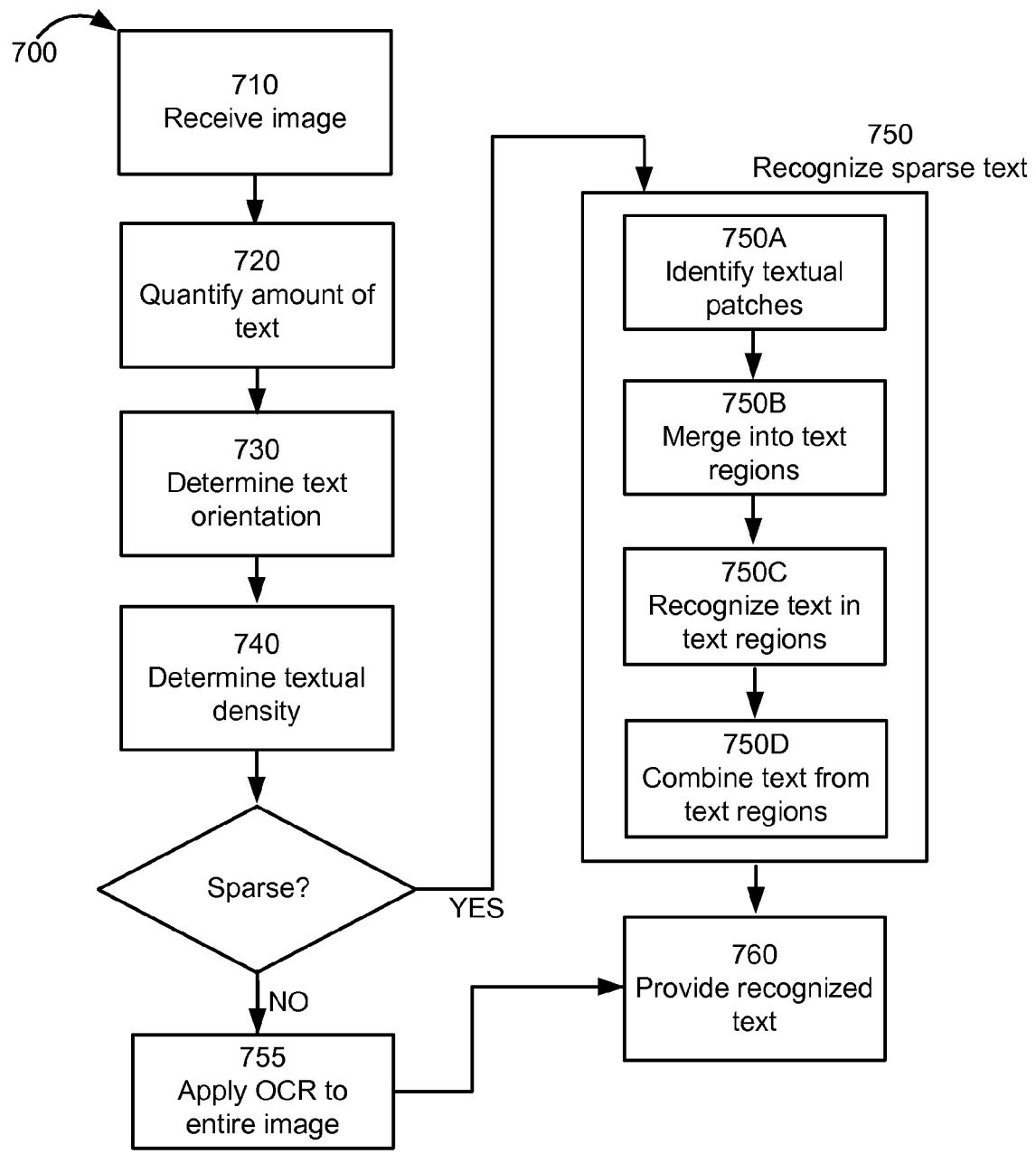
FIG. 7 is a flowchart illustrating a high-level view of steps carried out by the text recognition server of FIG. 1 for recognizing text in an image, according to one embodiment.

FIG. 7 is a flowchart illustrating a high-level view of steps carried out by the text recognition server 110 for recognizing text in an image, according to one embodiment.

At step 710, the text recognition server 110 receives an image for processing. The particular source of the image could vary. For example, the image could be received directly from a client device 120 via the network 140 and the interface module 105, or it could be read from local storage on the image processing system 100.

At step 720, the text recognition server 110 quantifies the amount of text present in both the image and in each rotated version of the image (if any). As described above with respect to the text orientation determination module 330, in one embodiment the quantification comprises counting the number of patches found by a text identification algorithm, such as that of text detection module 320, to contain text.

At step 730, the text recognition server 110 determines text orientation. In one embodiment, the text orientation server 110 compares the quantification output values produced at step 720, and the version of the image with the greatest value is the version processed in subsequent steps. In another embodiment, multiple versions can be processed in subsequent steps, e.g., in cases where none of the versions of the image has an associated quantification output that is sufficiently greater than that of the others.

At step 740, the text recognition server 110 determines whether the image to be analyzed (such as either the original image or the rotated image) is textually sparse or dense. In one embodiment, this determination comprises comparing the quantification result associated with the analyzed image, such as the number of image patches found to contain text to some threshold (e.g., 2,000 patches), with numbers greater than or equal to the threshold indicating dense text, and numbers less than the threshold indicating sparse text.

If the image represents dense text, then the text recognition server 110 applies 755 an OCR algorithm to the entire image as a whole, thereby producing recognized text. If the image represents sparse text, however, then the text recognition server 110 proceeds to recognize 750 the sparse text as described above with respect to the sparse text recognition module 350. Specifically, the recognition of the text within a sparse image comprises identifying 750A textual patches (e.g., using a higher-quality algorithm than that used in step 720 to quantify the amount of text), grouping 750B textual patches proximate to one another (e.g., adjacent, or overlapping) into a single text region, thereby producing a set of distinct text regions, and recognizing 750C text in each of the text regions, such as by application of an OCR algorithm to each of the regions. The recognized text from the set of distinct text regions is then combined 750D in some manner, such as by concatenating the text in an order corresponding to a language with which the image is associated, to produce a final sparse text result for the image.

The application by the sparse text recognition module 350 of the OCR algorithm to each text region, rather than to the image as a whole, reduces processing overhead by avoiding OCR analysis of regions not considered to contain text, and also improves accuracy by avoiding analysis of regions evidently lacking text but possibly containing visual elements (e.g., textures) that an OCR algorithm might mis-recognize as random characters of text. It additionally enables a reduction in overall processing time by allowing parallelization, in that each identified region of grouped text patches can be distributed to a separate processing unit for analysis by the OCR algorithm.

In an embodiment in which an inconclusive result from the text orientation determination step 730 causes steps 750A-D to be applied to both the original and rotated versions of the image, the results of each are then further tested to determine which result is better. For example, in one embodiment the words of each are compared against some dictionary to determine which result contains more, or a greater percentage of, valid words, and that result is selected as the output of step 750.

Finally, the text recognition module 110 provides 760 the recognized text—whether produced from a sparse or dense image—to some destination. In one embodiment, the destination is a client device 120 that submitted the analyzed image to the image processing system 110. In another embodiment, the destination is another component of the image processing system 100, such as the interface module 105, which can assemble the recognized text along with the results of any other servers of the image processing system into a single result for transmission to the client device 120 or provide the recognized text as input to some other server or module. For example, the recognized text could be provided as an additional input to a facial recognition module, or it could be provided to a search engine, which would produce search results and provide them to the client device 120.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for the purpose of example, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of recognizing text in an image, comprising:
   identifying a first plurality of patches within the image;
   applying, to each patch of the first plurality of patches, a first text detection algorithm that indicates whether a patch contains text, thereby identifying a first set of patches that contain text;
   determining whether the image represents sparse text or dense text based at least in part on the identified first set of patches;
   responsive to the image representing sparse text:
      identifying within the image, using a second text detection algorithm, a second set of patches that contain text, and
      performing optical character recognition on the second set of patches that contain text to obtain a textual result;
   responsive to the image representing dense text:
      performing optical character recognition on the image as a whole to produce the textual result; and
      storing the textual result.

2. The computer-implemented method of claim 1, wherein determining that the image represents sparse text comprises:
   determining a number of patches within the identified first set of patches that contain text; and
   comparing the number of patches that contain text to a threshold, wherein the image is deemed to represent sparse text when the number of patches is below the threshold.

3. The computer-implemented method of claim 1, wherein determining that the image represents sparse text comprises:
   determining an approximate number of characters in the image;
   comparing the approximate number of characters to a threshold, wherein the properly-oriented image is deemed to represent sparse text when the number of characters is below the threshold.

4. The computer-implemented method of claim 1, further comprising:
   grouping patches of the second set of patches that contain text and are proximate to one another into a text region,
   wherein performing optical character recognition on the second set of patches that contain text to obtain the textual result comprises performing optical character recognition on the text region.

5. The computer-implemented method of claim 4, wherein grouping patches of the second set of patches that are proximate to one another into the text region comprises combining overlapping patches and forming the text region from a union of areas of the combined patches.

6. The computer-implemented method of claim 1, wherein the second set of patches comprises patches that overlap with each other or patches of different sizes.

7. A computer system for recognizing text in an image, comprising:
   at least one computer processor; and
   a computer program executable by the computer processor and performing actions comprising:
      identifying a first plurality of patches within the image,
      applying, to each patch of the first plurality of patches, a first text detection algorithm that indicates whether a patch contains text, thereby identifying a first set of patches that contain text,
      determining whether the image represents sparse text or dense text based at least in part on the identified first set of patches,
      responsive to the image representing sparse text:
         identifying within the image, using a second text detection algorithm, a second set of patches that contain text,
         performing optical character recognition on the second set of patches that contain text to obtain a textual result,
      responsive to the image representing dense text:
         performing optical character recognition on the image as a whole to produce the textual result, and
         storing the textual result.

8. The computer system of claim 7, wherein determining that the image represents sparse text comprises:
   determining a number of patches within the identified first set of patches that contain text; and
   comparing the number of patches that contain text to a threshold, wherein the image is deemed to represent sparse text when the number of patches is below the threshold.

9. The computer system of claim 7, wherein determining that the image represents sparse text comprises:
   determining an approximate number of characters in the image;
   comparing the approximate number of characters to a threshold, wherein the properly-oriented image is deemed to represent sparse text when the number of characters is below the threshold.

10. The computer system of claim 7, wherein the actions further comprise:
    grouping patches of the second set of patches that contain text and are proximate to one another into a text region,
    wherein performing optical character recognition on the second set of patches that contain text to obtain the textual result comprises performing optical character recognition on the text region.

11. The computer system of claim 10, wherein grouping patches of the second set of patches that are proximate to one another into the text region comprises combining overlapping patches and forming the text region from a union of areas of the combined patches.

12. The computer system of claim 7, wherein the second set of patches comprises patches that overlap with each other or patches of different sizes.

13. A computer-implemented method of recognizing text in an image, comprising:
    identifying a first plurality of patches within the image;
    applying, to each patch of the first plurality of patches, a first text detection algorithm that indicates whether a patch contains text, thereby identifying a first set of patches that contain text;
    determining whether the image represents sparse text or dense text based at least in part on a number of patches within the identified first set of patches;

when the image represents sparse text:
    identifying within the image, using a second text detection algorithm, a second set of patches that contain text, and
    performing optical character recognition on the second set of patches that contain text to obtain a textual result, and
when the image represents dense text:
    performing optical character recognition on the image as a whole to obtain the textual result; and
storing the textual result.

14. The computer-implemented method of claim 13, wherein determining whether the image represents sparse text or dense text comprises:
    determining a number of patches within the identified first set of patches that contain text; and
    comparing the number of patches that contain text to a threshold, wherein the image is deemed to represent sparse text when the number of patches is below the threshold and is deemed to represent dense text when the number of patches is above the threshold.

15. The computer-implemented method of claim 13, wherein determining whether the image represents sparse text or dense text comprises:
    determining an approximate number of characters in the image; and
    comparing the approximate number of characters to a threshold, wherein the image is deemed to represent sparse text when the approximate number of characters is below the threshold and is deemed to represent dense text when the approximate number of characters is above the threshold.

16. The computer-implemented method of claim 13, wherein performing optical character recognition on the second set of patches that contain text to obtain a textual result comprises:
    grouping patches of the second set of patches that contain text and are proximate to one another into a text region; and
    performing optical character recognition on the text region.

17. The computer-implemented method of claim 16, wherein grouping patches of the second set of patches that are proximate to one another into the text region comprises combining overlapping patches and forming the text region from a union of areas of the combined patches.

18. The computer-implemented method of claim 13, wherein the second set of patches comprises patches that overlap with each other or patches of different sizes.

19. The computer-implemented method of claim 1, wherein identifying the second set of patches comprises identifying the first set of patches.

20. The computer system of claim 7, wherein identifying the second set of patches comprises identifying the first set of patches.

* * * * *